United States Patent
Hill et al.

(10) Patent No.: US 8,795,428 B1
(45) Date of Patent: *Aug. 5, 2014

(54) AERATED INORGANIC POLYMER COMPOSITIONS AND METHODS OF MAKING SAME

(71) Applicant: Boral Industries Inc., Roswell, GA (US)

(72) Inventors: Russell L. Hill, San Antonio, TX (US); Zhaozhou Zhang, San Antonio, TX (US); Mark Joseph Hollett, Fort Worth, TX (US); Li Ai, San Antonio, TX (US)

(73) Assignee: Boral IP Holdings (Australia) Pty Limited, Sydney (AU)

( * ) Notice: Subject to any disclaimer, the term of this patent is extended or adjusted under 35 U.S.C. 154(b) by 0 days.

This patent is subject to a terminal disclaimer.

(21) Appl. No.: 13/646,060

(22) Filed: Oct. 5, 2012

Related U.S. Application Data

(60) Provisional application No. 61/544,501, filed on Oct. 7, 2011.

(51) Int. Cl.
*C04B 7/28* (2006.01)

(52) U.S. Cl.
USPC .................. 106/705; 106/708; 106/DIG. 1

(58) Field of Classification Search
USPC ................... 106/705, DIG. 1, 708
See application file for complete search history.

(56) References Cited

U.S. PATENT DOCUMENTS

| | | | | |
|---|---|---|---|---|
| 4,842,649 | A * | 6/1989 | Heitzmann et al. | 106/706 |
| 4,997,484 | A * | 3/1991 | Gravitt et al. | 106/708 |
| 5,374,308 | A * | 12/1994 | Kirkpatrick et al. | 106/709 |
| 5,387,283 | A * | 2/1995 | Kirkpatrick et al. | 106/709 |
| 5,435,843 | A * | 7/1995 | Roy et al. | 106/705 |
| 5,439,518 | A * | 8/1995 | Francis et al. | 106/705 |
| 5,453,310 | A | 9/1995 | Andersen et al. | |
| 5,490,889 | A * | 2/1996 | Kirkpatrick et al. | 106/709 |
| 6,443,258 | B1 | 9/2002 | Putt et al. | |
| 6,555,199 | B1 | 4/2003 | Jenkines | |
| 2013/0087076 | A1 | 4/2013 | Hill et al. | |
| 2013/0087077 | A1* | 4/2013 | Hill et al. | 106/695 |
| 2013/0087078 | A1* | 4/2013 | Hill et al. | 106/695 |
| 2013/0087079 | A1 | 4/2013 | Hill et al. | |
| 2013/0087939 | A1* | 4/2013 | Hill et al. | 264/31 |
| 2013/0133554 | A1* | 5/2013 | Lloyd et al. | 106/695 |
| 2013/0133555 | A1* | 5/2013 | Lloyd et al. | 106/695 |

FOREIGN PATENT DOCUMENTS

| | | |
|---|---|---|
| JP | 2004091230 | 3/2004 |
| KR | 20010090026 | 10/2001 |
| KR | 20070051111 | 5/2007 |
| WO | 2012142547 | 10/2012 |
| WO | 2013066561 | 10/2013 |
| WO | 2013052732 | 11/2013 |

OTHER PUBLICATIONS

International Search Report and Written Opinion, mailed Feb. 15, 2013, in International Patent Application No. PCT/US2012/058847.
International Search Report and Written Opinion, mailed Feb. 26, 2013, in International Patent Application No. PCT/US2012/058852.
"Effect of Mixing Time on Properties of Concrete." Technology Blog.Oct. 16, 2010 [Retrieved on May 31, 2013]. Retrieved from http://web.archive.org/web/20101016235150/http://civil-engg-world.blogspot.com/2008/12/effect-of-mixing-time-on-properties-of.html.
"Dry Cast vs. Wet Cast." Edward's Cast Stone Company. Feb. 12, 2010 [Retrieved on May 31, 2013]. Retrieved from http://web.archive.org/web/20100212132704/http://www.edwardscaststone.com/products_drywet.cfm.
Non-Final Office Action mailed Nov. 2, 2012, in U.S. Appl. No. 13/268,011.
Advisory Action mailed Jul. 26, 2013, in U.S. Appl. No. 13/267,967.
Final Office Action mailed Apr. 5, 2013, in U.S. Appl. No. 13/267,967.
Non-Final Office Action mailed Nov. 2, 2013, in U.S. Appl. No. 13/267,967.
Non-Final Office Action mailed Oct. 30, 2012, in U.S. Appl. No. 13/307,504.
Non-Final Office Action mailed May 30, 2013, in U.S. Appl. No. 13/268,211.
Final Office Action mailed May 9, 2013, in U.S. Appl. No. 13/267,969.
Non-Final Office Action mailed Nov. 6, 2012, in U.S. Appl. No. 13/267,969.
Non-Final Office Action mailed Jan. 17, 2014, in U.S. Appl. No. 13/307,188.
Non-Final Office Action mailed Feb. 12, 2014, in U.S. Appl. No. 13/269,283.

* cited by examiner

*Primary Examiner* — Paul Marcantoni
(74) *Attorney, Agent, or Firm* — Joel T. Charlton

(57) ABSTRACT

Inorganic polymer compositions and methods for their preparation are described herein. The compositions include the reaction product of a reactive powder, an activator, and optionally a retardant in the presence of water and an aerating agent. The reactive powder includes 85% or greater fly ash. The aerating agent can be a blowing agent, a foaming agent, or a mixture of these. Also described herein are building materials including the compositions.

21 Claims, No Drawings

AERATED INORGANIC POLYMER COMPOSITIONS AND METHODS OF MAKING SAME

CROSS-REFERENCE TO PRIORITY APPLICATIONS

This application claims priority to U.S. Provisional Application No. 61/544,501, filed Oct. 7, 2011, which is incorporated herein by reference in its entirety.

BACKGROUND

Certain building materials can be prepared from cementitious mixtures based on portland cement and can contain additives to enhance the properties of the materials. Fly ash is used in cementitious mixtures to provide enhanced durability and reduced permeability of the cementitious products. In addition to imparting improved performance properties, the use of fly ash is desirable because it is a recyclable product and would otherwise be a waste material. Furthermore, fly ash is less expensive than portland cement. Thus, there is a desire to provide high strength building products that are based on fly ash.

SUMMARY

Inorganic polymer compositions and methods for their preparation are described. The inorganic polymers include the reaction product of reactive powder, an activator, and optionally a retardant in the presence of water and an aerating agent selected from the group consisting of blowing agents, foaming agents, and mixtures thereof.

The reactive powder includes 85% by weight or greater fly ash. The fly ash can be present in an amount of greater than 90% by weight or greater than 95% by weight of the reactive powder. In some examples, the fly ash includes a calcium oxide content of from 18% to 35% by weight (e.g., from 23% to 30% by weight). The fly ash present in the reactive powder can include Class C fly ash. In some examples, greater than 75%, greater than 85%, or greater than 95% of the fly ash comprises Class C fly ash. The reactive powder can further include portland cement, calcium aluminate cement, calcium sulfoaluminate cement, slag, or a mixture of these. In some examples, the reactive powder can include 5% by weight or less of portland cement. In some examples, the composition is substantially free from portland cement.

In some embodiments, the activator used to prepare the inorganic polymers can include a citrate or citric acid. In some examples, the activator can include citric acid and/or sodium hydroxide. In some examples, the activator is present in an amount of from 1.5% to 8.5% based on the weight of the reactive powder. Optionally, a retardant (e.g., borax, boric acid, gypsum, phosphates, gluconates, or a mixture of these) is included in the composition. The retardant can be present, for example, in an amount of from 0.4% to 7.5% based on the weight of the reactive powder. In some examples, the composition is substantially free from retardants. In some examples, the weight ratio of water to reactive powder is from 0.06:1 to 0.25:1 (e.g., from 0.01:1 to less than 0.15:1).

The blowing agent can include aluminum powder, a peroxide, a perborate, chlorine dioxide, or a mixture of these. In some examples, the blowing agent includes a peroxide and the peroxide is provided to the composition as hydrogen peroxide, sodium peroxide, or an organic peroxide. In examples where the blowing agent includes a perborate, the perborate can be provided to the composition as sodium perborate. The blowing agent can be present in an amount of from 0.1% to 10% by weight of the reactive powder (e.g., from 0.5% to 5% by weight of the reactive powder). In some examples, the foaming agent includes non-ionic surfactants.

The inorganic polymer compositions can further include aggregate, such as lightweight aggregate. The compositions can further include a water reducer, a plasticizer (e.g., clay or a polymer), a pigment, fibers, or a photocatalyst.

Also described are building materials including the compositions described herein. The building materials can be, for example, roofing tiles, ceramic tiles, synthetic stone, thin bricks, bricks, pavers, panels, or underlay.

Further described is a method of producing an inorganic polymer composition, which includes mixing a reactive powder, an activator, and optionally a retardant in the presence of water and an aerating agent and providing a gas to the resultant mixture. In this method, reactive powder comprises 85% or greater fly ash and the aerating agent is selected from the group consisting of blowing agents, foaming agents, and mixtures thereof. In some examples, the reactants are mixed for a period of 15 seconds or less. The mixing can be performed, for example, at ambient temperature.

In some examples, the activator includes a citrate or citric acid. In some examples, the activator includes citric acid and sodium hydroxide. Optionally, the citric acid and sodium hydroxide are combined prior to mixing with the reactants. The weight ratio of the citric acid to sodium hydroxide can be from 0.4:1 to 2.0:1 (e.g., from 1.0:1 to 1.6:1). In some examples, the mixing produces a mixture having a pH of from 12 to 13.5.

The providing step can include providing air into the resulting mixture through mixing. For example, the providing step can comprise injecting gas into the resultant mixture and/or generating gas using a blowing agent. In some examples, the providing step is performed at ambient temperature.

The method can further include the steps of molding the resulting mixture and/or curing the composition. The curing step can be performed at an elevated temperature (e.g., from 250° F. to 500° F.).

The details of one or more embodiments are set forth in the description below. Other features, objects, and advantages will be apparent from the description and from the claims.

DETAILED DESCRIPTION

Inorganic polymer compositions and methods for their preparation are described herein. The compositions include the reaction product of a reactive powder, an activator, optionally a retardant, in the presence of water and an aerating agent. The reactive powder includes 85% by weight or greater fly ash. The aerating agent can be a blowing agent, a foaming agent, or mixture of these.

The reactive powder is a reactant used to form the inorganic polymer compositions described herein. The reactive powder for use in the reactions includes fly ash. Fly ash is produced from the combustion of pulverized coal in electrical power generating plants. Fly ash produced by coal-fueled power plants is suitable for use in reactive powder described herein. The fly ash can include Class C fly ash, Class F fly ash, or a mixture thereof. As such, the calcium content of the fly ash can vary. In exemplary compositions, the fly ash included in the reactive powder can have a calcium content, expressed as the oxide form (i.e., calcium oxide), of from 18% to 35% by weight. In some examples, the calcium oxide content of the fly ash is from 23% to 30% by weight.

In some examples, the majority of the fly ash present is Class C fly ash (i.e., greater than 50% of the fly ash present is Class C fly ash). In some examples, greater than 75%, greater than 85%, or greater than 95% of the fly ash present is Class C fly ash. For example, greater than 75%, greater than 76%, greater than 77%, greater than 78%, greater than 79%, greater than 80%, greater than 81%, greater than 82%, greater than 83%, greater than 84%, greater than 85%, greater than 86%, greater than 87%, greater than 88%, greater than 89%, greater than 90%, greater than 91%, greater than 92%, greater than 93%, greater than 94%, greater than 95%, greater than 96%, greater than 97%, greater than 98%, or greater than 99% of the fly ash present is Class C fly ash. In some embodiments, only Class C fly ash is used. In some embodiments, blends of Class C fly ash and Class F fly ash can be used, particularly if the overall CaO content is as discussed above.

The fly ash used in the reactive powder can be a fine fly ash. The use of a fine fly ash provides a higher surface area. As used herein, fine fly ash refers to fly ash having an average particle size of 25 microns or less. The average particle size for the fly ash can be from 5 microns to 25 microns, or from 10 microns to 20 microns.

Optionally, the fly ash is the principal component of the reactive powder and is present in an amount of 85% by weight or greater of the reactive powder. In some examples, the fly ash is present in an amount of 90% by weight or greater of the reactive powder or 95% by weight or greater of the reactive powder. For example, the fly ash can be present in an amount of 85% by weight or greater, 86% by weight or greater, 87% by weight or greater, 88% by weight or greater, 89% by weight or greater, 90% by weight or greater, 91% by weight or greater, 92% by weight or greater, 93% by weight or greater, 94% by weight or greater, 95% by weight or greater, 96% by weight or greater, 97% by weight or greater, 98% by weight or greater, or 99% by weight or greater based on the weight of the reactive powder.

The reactive powder for use as a reactant to form the inorganic polymer compositions can further include cementitious components, including portland cement, calcium aluminate cement, calcium sulfoaluminate cement, and/or slag. Optionally, portland cement can be included as a component of the reactive powder. Suitable types of portland cement include, for example, Type I ordinary portland cement (OPC), Type II OPC, Type III OPC, Type IV OPC, Type V OPC, low alkali versions of these portland cements, and mixtures of these portland cements. In these examples, no more than 10% by weight of portland cement is included in the reactive powder. In some examples, the reactive powder includes 5% by weight or less, 3% by weight or less, or 1% by weight or less of portland cement. For example, the reactive powder can include portland cement in an amount of 10% or less by weight, 9% or less by weight, 8% or less by weight, 7% or less by weight, 6% or less by weight, 5% or less by weight, 4% or less by weight, 3% or less by weight, 2% or less by weight, 1% or less by weight, or 0.5% or less by weight. In some examples, the reactive powder is substantially free from portland cement. For example, the reactive powder can include less than 0.1% by weight, less than 0.01% by weight, or less than 0.001% by weight of portland cement based on the weight of the reactive powder. In some embodiments, the reactive powder includes no portland cement.

Optionally, calcium aluminate cement (i.e., high aluminate cement) can be included in the reactive powder. In some examples, the calcium aluminate cement is present in an amount of 5% or less by weight of the reactive powder. For example, the reactive powder can include calcium aluminate cement in an amount of 5% or less, 4% or less, 3% or less, 2% or less, 1% or less, 0.9% or less, 0.8% or less, 0.7% or less, 0.6% or less, 0.5% or less, 0.4% or less, 0.3% or less, 0.2% or less, or 0.1% or less by weight. In some examples, the reactive powder can include calcium aluminate cement in an amount of from 0.5% to 5%, from 1% to 4.5%, or from 2% to 4% by weight. The calcium aluminate cement can be used, in some examples, in compositions that include less than 3% hydrated or semihydrated forms of calcium sulfate (e.g., gypsum). In some examples, the reactive powder is substantially free from calcium aluminate cement or includes no calcium aluminate cement.

In some examples, the reactive powder for use as a reactant to form the inorganic polymer compositions can further include calcium sulfoaluminate cement. In some examples, the calcium sulfoaluminate cement is present in an amount of from 0.1% to 5% based on the weight of the reactive powder. For example, the calcium sulfoaluminate cement can be present in an amount of from 0.5% to 5% by weight or from 1% to 5% by weight of the reactive powder. In some examples, the amount of calcium sulfoaluminate cement is 0.1%, 0.2%, 0.3%, 0.4%, 0.5%, 0.6%, 0.7%, 0.8%, 0.9%, 1%, 2%, 3%, 4%, or 5% based on the weight of the reactive powder. In some examples, the reactive powder is substantially free from calcium sulfoaluminate cement or includes no calcium sulfoaluminate cement.

The reactive powder can also include a ground slag such as blast furnace slag in an amount of 10% or less by weight. For example, the reactive powder can include slag in an amount of 10% or less, 9% or less, 8% or less, 7% or less, 6% or less, 5% or less, 4% or less, 3% or less, 2% or less, or 1% or less by weight.

The reactive powder can also include calcium sources such as limestone (e.g., ground limestone), quicklime, slaked lime, or hydrated lime in an amount of 10% or less by weight of the reactive powder. For example, limestone can be present in an amount of 10% or less, 9% or less, 8% or less, 7% or less, 6% or less, 5% or less, 4% or less, 3% or less, 2% or less, or 1% or less by weight of the reactive powder.

The reactive powder can also include a tricalcium aluminate additive. As would be understood by those skilled in the art, tricalcium aluminate is present in a small amount in portland cement. The tricalcium aluminate would be present as an additive, wherein the tricalcium aluminate is not a portland cement constituent. The tricalcium aluminate additive can be present in an amount of from 0.1% to 10% by weight, or 1% to 5% of the reactive powder.

Anhydrous calcium sulfate can be optionally included as an additional reactant used to form the inorganic polymer compositions described herein. The anhydrous calcium sulfate can be present as a reactant in an amount of 0.1% by weight or greater based on the weight of the reactive powder and has been found to increase the compressive strength of the inorganic polymer products. In some examples, the anhydrous calcium sulfate can be present in an amount of from 1% to 10%, 2% to 8%, 2.5% to 7%, or 3% to 6% by weight of the reactive powder. For example, the amount of anhydrous calcium sulfate can be 0.5% or greater, 1% or greater, 1.5% or greater, 2% or greater, 2.5% or greater, 3% or greater, 3.5% or greater, 4% or greater, 4.5% or greater, or 5% or greater based on the weight of the reactive powder.

An activator is a further reactant used to form the inorganic polymer compositions described herein. The activator allows for rapid setting of the inorganic polymer compositions and also imparts compressive strength to the compositions. The activator can include one or more of acidic, basic, and/or salt components. For example, the activator can include citrates, hydroxides, metasilicates, carbonates, aluminates, sulfates, and/or tartrates. The activator can also include other multifunctional acids that are capable of complexing or chelating calcium ions (e.g., EDTA). Specific examples of suitable citrates for use as activators include citric acid and its salts, including, for example, sodium citrate and potassium citrate. Specific examples of suitable tartrates include tartaric acid and its salts (e.g., sodium tartrate and potassium tartrate). In some examples, the activator can include alkali metal hydroxides, such as sodium hydroxide and potassium hydroxide. Further examples of suitable activators include metasilicates (e.g., sodium metasilicate and potassium metasilicate); carbonates (e.g., sodium carbonate and potassium carbonate); aluminates (e.g., sodium aluminate and potassium aluminate); and sulfates (e.g., sodium sulfate and potassium sulfate). In some examples, the activator includes citric acid, tartaric acid, or mixtures thereof. In some examples, the activator includes sodium hydroxide. In some examples, the activator includes a mixture of citric acid and sodium hydroxide. In examples including a mixture of citric acid and sodium hydroxide, the weight ratio of citric acid present in the mixture to sodium hydroxide present in the mixture is from 0.4:1 to 2.0:1, 0.6:1 to 1.9:1, 0.8:1 to 1.8:1, 0.9:1 to 1.7:1, or 1.0:1 to 1.6:1. The activator components can be pre-mixed prior to being added to the other reactive components in the inorganic polymer or added separately to the other reactive components. For example, citric acid and sodium hydroxide could be combined to produce sodium citrate and the mixture can include possibly one or more of citric acid and sodium hydroxide in stoichiometric excess. In some embodiments, the activator includes a stoichiometric excess of sodium hydroxide. The total amount of activators can include less than 95% by weight of citrate salts. For example, the total amount of activator can include from 25-85%, 30-75%, or 35-65% citrate salts by weight. The mixture in solution and the mixture when combined with reactive powder can have a pH of from 12 to 13.5 or about 13.

The activator can be present as a reactant in an amount of from 1.5% to 8.5% dry weight based on the weight of the reactive powder. For example, the activator can be present in an amount of from 2% to 8%, from 3% to 7%, or from 4% to 6%. In some examples, the activator can be present in an amount of 1.5%, 2%, 2.5%, 3%, 3.5%, 4%, 4.5%, 5%, 5.5%, 6%, 6.5%, 7%, 7.5%, 8% or 8.5% dry weight based on the weight of the reactive powder. For example, when sodium hydroxide and citric acid are used as the activators, the amount of sodium hydroxide used in the activator solution can be from 0.3 to 15.6, 0.5 to 10, 0.75 to 7.5, or 1 to 5 dry parts by weight based on the weight of reactive powder and the amount of citric acid used in the activator solution can be from 0.25 to 8.5, 0.5 to 0.7, 0.75 to 0.6, or 1 to 4.5 dry parts by weight based on the weight of reactive powder. The resulting activator solution can include sodium citrate and optionally one or more of citric acid or sodium hydroxide.

The activator can be provided, for example, as a solution. In some examples, the activator can be provided in water as an aqueous solution in a concentration of from 10% to 50% or from 20% to 40% based on the weight of the solution. For example, the concentration of the activator in the aqueous solution can be from 25% to 35% or from 28% to 32% based on the weight of the solution. Examples of suitable concentrations for the activator in the aqueous solution include 10%, 15%, 20%, 25%, 30%, 35%, 40%, 45%, or 50% based on the weight of the solution.

The reactants used to form the inorganic polymer compositions can further include a retardant. Retardants are optionally included to prevent the composition from stiffening too rapidly, which can result in a reduction of strength in the structure. Examples of suitable retardants for inclusion as reactants include borax, boric acid, gypsum, phosphates, gluconates, or a mixture of these. The retardant can be provided in solution with the activator (e.g., borax or boric acid) and/or can be provided as an additive with the reactive powder (e.g., gypsum). In some examples, the retardant is present in an amount of from 0.4% to 7.5% based on the weight of the reactive powder. For example, the retardant can be present in an amount of from 0.5% to 5%, 0.6% to 3%, 0.7 to 2.5%, or 0.75% to 2.0% based on the weight of the reactive powder. In some embodiments, when gypsum is used as a retardant, it is used in an amount of 3% by weight or less based on the weight of the reactive powder. In some embodiments, borax is used as the retardant. When citric acid and sodium hydroxide are used as the activators, the weight ratio of borax to sodium hydroxide can be 0.3:1 to 1.2:1 (e.g., 0.8:1 to 1.0:1). In some examples, lower ratios of 0.3:1 to 0.8:1 can be the result of including an additional retardant such as gypsum. In some examples, the composition is substantially free from retardants or includes no retardants.

The reactants described herein can optionally include less than 3.5% by weight of additional sulfates. As would be understood by those skilled in the art, sulfates are present in the fly ash. Thus, "additional sulfates" refers to sulfates other than those provided by the fly ash. In some examples, the composition can include less than 3.5% by weight of sulfates based on the amount of reactive powder other than those provided by the fly ash. For example, the composition can include less than 3.5% by weight, less than 3% by weight, less than 2.5% by weight, less than 2% by weight, less than 1.5% by weight, less than 1% by weight, or less than 0.5% by weight of sulfates based on the amount of reactive powder other than those provided by the fly ash. In some examples, the composition is substantially free from additional sulfates. For example, the composition can include less than 0.1% by weight, less than 0.01% by weight, or less than 0.001% by weight of additional sulfates based on the amount of reactive powder. In some embodiments, the composition includes no additional sulfates.

When present, the additional sulfates can be provided in the form of gypsum (i.e., calcium sulfate dihydrate). As described above, gypsum can be present in the composition as a retardant. In some examples, the composition includes gypsum in an amount of less than 3.5% by weight based on the amount of reactive powder. For example, the composition can include gypsum in an amount of less than 3.5% by weight, less than 3% by weight, less than 2.5% by weight, less than 2% by weight, less than 1.5% by weight, less than 1% by weight, or less than 0.5% by weight.

The inorganic polymer compositions described herein are prepared in the presence of aerating agents, including blowing agents and foaming agents. Blowing agents can be included in the compositions to produce a gas and generate a foamed composition. Examples of suitable blowing agents include aluminum powder, perborates (e.g., sodium perborate), peroxides (e.g., $H_2O_2$ or an organic peroxide), and chloride dioxide. The blowing agent can be present in an amount of from 0.1% to 10% by weight of the reactive powder. In some examples, the blowing agents can be included in the compositions in an amount of from 0.5% by weight to 9% by weight, from 1% by weight to 8% by weight, or from 2% by weight to 7% by weight. In some examples, the blowing agents can be included in the compositions in an amount of from 0.5% to 5% by weight of the reactive powder. For example, the composition can include blowing agents in an amount of 10% by weight or less, 9% by weight or less, 8% by weight or less, 7% by weight or less, 6% by weight or less, 5% by weight or less, 4% by weight or less, 3% by weight or less, 2% by weight or less, 1% by weight or less, 0.5% by weight or less, 0.4% by weight or less, 0.3% by weight or less, 0.2% by weight or less, or 0.1% by weight or less based on the weight of the reactive powder.

The aerating agents described herein can also include foaming agents. The foaming agents can be added to the compositions described herein to produce a foamed composition. In some examples, the foaming agent can be an air-entraining agent. Foaming agents can be used to help the system maintain air or other gases, e.g., from the mixing process. The foaming agents can include non-ionic surfactants, anion surfactants, and/or cationic surfactants. Examples of suitable foaming agents include sodium alkyl ether sulfate, ammonium alkyl ether sulfate, sodium alpha olefin sulfonate, sodium deceth sulfate, ammonium deceth sulfate, sodium laureth sulfate, and sodium dodecylbenzene sulfonate. The foaming agents can be provided in an amount of 0.1% or less based on the weight of the reactive powder. In some examples, the foaming agents can be included in the compositions in an amount of from 0.001% by weight to 0.1% by weight or from 0.005% by weight to 0.05% by weight (e.g., 0.01% by weight). For example, the composition can include foaming in an amount of 0.1% by weight or less, 0.09% by weight or less, 0.08% by weight or less, 0.07% by weight or less, 0.06% by weight or less, 0.05% by weight or less, 0.04% by weight or less, 0.03% by weight or less, 0.02% by weight or less, 0.01% by weight or less, 0.009% by weight or less, 0.008% by weight or less, 0.007% by weight or less, 0.006% by weight or less, 0.005% by weight or less, 0.004% by weight or less, 0.003% by weight or less, 0.002% by weight or less, or 0.001% by weight or less based on the weight of the reactive powder.

The reactants to form the inorganic polymer compositions are reacted in the presence of water. The water can be provided in the reactive mixture by providing the activator and optionally the retardant in solution and/or by adding water directly to the reactive mixture. The solution to binder or solution to reactive powder weight ratio (i.e., the ratio of the solution including activator and optionally the retardant to reactive powder) can be from 0.09:1 to 0.5:1, depending on the product being made and the process being used for producing the product. For example, the solution to binder weight ratio can be from 0.09:1 to 0.19:1. The water to reactive powder (or water to binder) weight ratio can be from 0.06:1 to less than 0.15:1, depending on the product being made and the process being used for producing the product. For example, the water to reactive powder (or water to binder) ratio can be from 0.06:1 to 0.4:1. In some embodiments, the water to binder ratio can be from 0.06:1 to 0.25:1 or from 0.06:1 to less than 0.15:1. In some embodiments, the water to binder ratio is less than 0.20:1. In some embodiments, the water to binder ratio can be from 0.15:1 to 0.4:1, particularly when aggregate is used that absorbs a significant amount of water or solution (e.g., 20-30%). In some embodiments, the water to binder ratio is from 0.15:1 to 0.25:1 or can be from 0.25 to 0.4:1. The water to binder ratio can be 0.06:1, 0.07:1, 0.08:1, 0.09:1, 0.10:1, 0.11:1, 0.12:1, 0.13:1, 0.14:1, 0.15:1, 0.16:1, 0.17:1, 0.18:1, 0.19:1, 0.20:1, 0.21:1, 0.22:1, 0.23:1, 0.24:1, 0.25:1, 0.26:1, 0.27:1, 0.28:1, 0.29:1, 0.30:1, 0.31:1, 0.32:1, 0.33:1, 0.34:1, 0.35:1, 0.36:1, 0.37:1, 0.38:1, 0.39:1, or 0.40:1.

The inorganic polymer can have a calcia to silica molar ratio of from 0.6:1 to 1.1:1. For example, the calcia to silica molar ratio can be 0.6:1, 0.7:1, 0.8:1, 0.9:1, 1.0:1 or 1.1:1.

One or more aggregates or fillers can be further used in the inorganic polymer compositions described herein. In some examples, the aggregate includes lightweight aggregate. Examples of suitable lightweight aggregate includes bottom ash, expanded clay, expanded shale, expanded perlite, vermiculite, volcanic tuff, pumice, hollow ceramic spheres, hollow plastic spheres, expanded plastic beads (e.g., polystyrene beads), ground tire rubber, and mixtures of these. Further examples of suitable aggregates and fillers include other types of ash such as those produced by firing fuels including industrial gases, petroleum coke, petroleum products, municipal solid waste, paper sludge, wood, sawdust, refuse derived fuels, switchgrass, or other biomass material; ground/recycled glass (e.g., window or bottle glass); milled glass; glass spheres; glass flakes; activated carbon; calcium carbonate; aluminum trihydrate (ATH); silica; sand; alluvial sand; natural river sand; ground sand; crushed granite; crushed limestone; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; soy meal; pulverized foam; and mixtures thereof.

In some embodiments, inorganic fibers or organic fibers can be included in the inorganic polymer compositions, e.g., to provide increased strength, stiffness or toughness. In some examples, fire resistant or retardant glass fibers can be included to impart fire resistance or retarding properties to the inorganic polymer compositions. Fibers suitable for use with the inorganic polymer compositions described herein can be provided in the form of individual fibers, fabrics, rovings, or tows. These can be chopped and can be provided before or during the mixing of the inorganic polymer reactants to provide desired fiber lengths. Alternately, the fibers can be added after the inorganic polymer reactants have been mixed. The fibers can be up to about 2 in. in length. In some examples, the fibers are about 10 mm in length. The fibers can be provided in a random orientation or can be axially oriented. The fibers can be coated with a sizing to modify performance to make the fibers reactive. Exemplary fibers include glass, polyvinyl alcohol (PVA), carbon, basalt, wollastonite, and natural (e.g., bamboo or coconut) fibers. Examples of suitable fibers and methods of providing fibers in cementitious compositions are found, for example, in U.S. Pat. No. 5,108,679, which is herein incorporated by reference. The fibers can be included in an amount of 0.1% to 6% based on the weight of reactive powder. For example, the fibers can be included in an amount of 0.5% to 5%, 0.75% to 4%, or 1% to 3% based on the weight of reactive powder. In some embodiments, the fibers are provided in an amount of 2% or less by weight, based on the weight of the cementitious composition including aggregate.

The inclusion of aggregate or filler in the inorganic polymer compositions described herein can modify and/or improve the chemical and mechanical properties of the compositions. For example, the optimization of various properties of the compositions allows their use in building materials and other structural applications. High aggregate and filler loading levels can be used in combination with the compositions without a substantial reduction of (and potentially an improvement in) the intrinsic structural and physical properties of the inorganic polymer compositions. Further, the use of lightweight aggregate provides lightweight building products without compromising the mechanical properties of the inorganic polymer compositions.

The aggregate or filler can be added to the composition at a weight ratio of 0.5:1 to 4.0:1 based on the weight of reactive powder (i.e., aggregate to binder weight ratio). In some embodiments, the aggregate to binder weight ratio can be from 0.5:1 to 2.5:1 or from 1:1 to 2:1 depending on the product to be produced. In some embodiments, the aggregate to binder weight ratio can be from 1.5:1 to 4:1 or from 2:1 to 3.5:1. For example, the aggregate to binder weight ratio can be 0.5:1, 0.6:1, 0.7:1, 0.8:1, 0.9:1, 1.0:1, 1.1:1, 1.2:1, 1.3:1, 1.4:1, 1.5:1, 1.6:1, 1.7:1, 1.8:1, 1.9:1, 2.0:1, 2.1:1, 2.2:1, 2.3:1, 2.4:1, 2.5:1, 2.6:1, 2.7:1, 2.8:1, 2.9:1, 3.0:1, 3.1:1, 3.2:1, 3.3:1, 3.4:1, 3.5:1, 3.6:1, 3.7:1, 3.8:1, 3.9:1, or 4.0:1.

Additional components useful with the compositions described herein include water reducers, plasticizers, pigments, anti-efflorescence agents, photocatalysts, ultraviolet light stabilizers, fire retardants, antimicrobials, and antioxidants.

Water reducers can be included in the compositions described herein to reduce the amount of water in the composition while maintaining the workability, fluidity, and/or plasticity of the composition. In some examples, the water reducer is a high-range water reducer, such as, for example, a superplasticizer admixture. Examples of suitable water reducers include lignin, naphthalene, melamine, polycarboxylates, lignosulfates and formaldehyde condensates (e.g., sodium naphthalene sulfonate formaldehyde condensate). Water reducers can be provided in an amount of from greater than 0 to 1% by weight based on the weight of reactive powder.

Plasticizers can also be included in the compositions described herein. Plasticizers enhance the extrudability of the inorganic polymer compositions. Examples of suitable plasticizers for use with the compositions described herein include clays (e.g., bentonite, expanded clay, and kaolin clay) and polymers (e.g., JEFFSPERSE X3202, JEFFSPERSE X3202RF, and JEFFSPERSE X3204, each commercially available from Huntsman Polyurethanes; Geismar, La.).

Pigments or dyes can optionally be added to the compositions described herein. An example of a pigment is iron oxide, which can be added in amounts ranging from 1 wt % to 7 wt % or 2 wt % to 6 wt %, based on the weight of reactive powder.

Anti-efflorescence agents can be included in the compositions to limit the transport of water through the structure and thus limit the unbound salts that are brought to the surface of the structure thereby limiting the aesthetic properties of the structure. Suitable anti-efflorescence agents include siloxanes, silanes, stearates, amines, fatty acids (e.g., oleic acid and linoleic acid), organic sealants (e.g., polyurethanes and acrylics), and inorganic sealants (e.g., polysilicates). Anti-efflorescence agents can be included in the compositions in an amount of from 0.01 wt % to about 1 wt % based on the weight of the reactive powder.

Photocatalysts such as anatase (titanium dioxide) can be used that produce superoxidants that can oxidize $NO_X$ and VOC's to reduce pollution. The photocatalysts can make the system super hydrophobic and self-cleaning (e.g., in the presence of smog). These materials can also act as antimicrobials and have impact on algae, mold, and/or mildew growth.

Ultraviolet (UV) light stabilizers, such as UV absorbers, can be added to the compositions described herein. Examples of UV light stabilizers include hindered amine type stabilizers and opaque pigments like carbon black powder. Fire retardants can be included to increase the flame or fire resistance of the compositions. Antimicrobials, such as copper complexes, can be used to limit the growth of mildew and other organisms on the surface of the compositions. Antioxidants, such as phenolic antioxidants, can also be added. Antioxidants can provide increased UV protection, as well as thermal oxidation protection.

A method of producing an inorganic polymer composition is also described herein. The method includes mixing reactants comprising a reactive powder, an activator, and optionally a retardant in the presence of water and an aerating agent. As described above, the reactive powder comprises 85% by weight or greater fly ash. The components can be mixed from 2 seconds to 5 minutes. In some examples, the reactants are mixed for a period of 15 seconds or less (e.g., 2 to 10 or 4 to 10 seconds). The mixing times, even in the order of 15 seconds or less, result in a homogenous mixture. The mixing can be performed at an elevated temperature (e.g., up to 160° F.) or at ambient temperature. In some embodiments, the mixing occurs at ambient temperature. The reactants are allowed to react to form the inorganic polymer composition.

The compositions can be produced using a batch, semi-batch, or continuous process. At least a portion of the mixing step, reacting step, or both, can be conducted in a mixing apparatus such as a high speed mixer or an extruder. The method can further include the step of extruding the resulting composition through a die or nozzle. In examples where the activator includes more than one component, the components can be pre-mixed prior to reacting with the reactive powder and optionally the retardant, as noted above. In some embodiments, a mixing step of the method used to prepare the compositions described herein includes: (1) combining the activators in either solid form or aqueous solution (e.g., combining an aqueous solution of citric acid with an aqueous solution of sodium hydroxide) and adding any additional water to provide a desired concentration for the activator solution; and 2) mixing the activator solution with the reactive powder and aggregate.

An ultrasonic or vibrating device can be used for enhanced mixing and/or wetting of the various components of the compositions described herein. Such enhanced mixing and/or wetting can allow a high concentration of reactive powder to be mixed with the other reactants. The ultrasonic or vibrating device produces an ultrasound of a certain frequency that can be varied during the mixing and/or extrusion process. Alternatively, a mechanical vibrating device can be used. The ultrasonic or vibrating device useful in the preparation of compositions described herein can be attached to or adjacent to an extruder and/or mixer. For example, the ultrasonic or vibrating device can be attached to a die or nozzle or to the exit port of an extruder or mixer. An ultrasonic or vibrating device can provide de-aeration of undesired gas bubbles and better mixing for the other components, such as blowing agents, plasticizers, and pigments.

After mixing the components, a gas can be provided to the resultant mixture. For example, air can be mixed into the resulting mixture. In some examples, gas can be injected into the resultant mixture. Further, gas can be generated using a blowing agent as described herein. Providing the gas to the mixture can be performed at ambient temperature or at an elevated temperature. In some examples, the providing step is performed at ambient temperature.

The resultant mixture can optionally be molded using, for example, a shaping mold, and can be allowed to cure. For example, the composition can be allowed to cure in individual molds or it can be allowed to cure in a continuous forming system such as a belt molding system. Optionally, the curing step can be performed at an elevated temperature. For example, the curing step can be performed at a temperature of 250° F. to 500° F. (e.g., from 275° F. to 475° F., 300° F. to 450° F., or 325° F. to 400° F.). The curing can be performed for up to 10 hours. For example, the curing can be performed for 10 hours or less, 9 hours or less, 8 hours or less, 7 hours or less, 6 hours or less, 5 hours or less, 4 hours or less, 3 hours or less, 2 hours or less, 1 hour or less, or less than 1 hour.

The method can further include allowing the product to set. The product can be allowed to set, for example, in the shaping mold used in the forming step. The composition can have a set time in the mold, for example, of from 1 to 300 minutes and can be less than 15 minutes (e.g., 2-5 minutes).

The inorganic polymer compositions described herein can be formed into shaped articles and used in various applications, including building materials. Examples of such building materials include roofing tiles (e.g., shake and slate tile), ceramic tiles, synthetic stone, architectural stone, thin bricks, bricks, pavers, panels, underlay (e.g., bathroom underlay), banisters, lintels, pipe, posts, signs, guard rails, retaining walls, park benches, tables, railroad ties, and other shaped articles.

The examples below are intended to further illustrate certain aspects of the methods and compositions described herein, and are not intended to limit the scope of the claims. Parts and percentages are provided on a weight basis herein, unless indicated otherwise.

EXAMPLES

Examples of inorganic polymer compositions contemplated by mixing a reactive powder, an activator, and aggregate in the presence of water and an aerating agent are described below in Tables 1-4.

TABLE 1

Example 1:

| Material | Parts by Weight |
| --- | --- |
| Class C Fly Ash | 100 |
| Sodium Hydroxide | 1.9 |
| Citric Acid | 1.1 |
| Borax | 0.5 |
| Aluminum Powder | 0.5 |
| Sodium Alkyl Ether Sulfate | 0.01 |
| Water | 15 |
| Sand | 200 |

In Example 1 (Table 1), the reactive powder includes Class C fly ash. The activator includes citric acid and sodium hydroxide, which are combined prior to mixing with the other components. The retardant is borax, the aerating agent is aluminum powder and sodium alkyl ether sulfate, and the aggregate is sand. The components are mixed for 15 seconds at ambient temperature, fed into molds, and allowed to cure.

TABLE 2

Example 2:

| Material | Parts by Weight |
| --- | --- |
| Class C Fly Ash | 97 |
| Anhydrous Calcium Sulfate | 3 |
| Sodium Hydroxide | 1.5 |
| Citric Acid | 1.2 |
| Borax | 0.38 |
| Gypsum | 2 |
| Sodium Peroxide | 2 |
| Water | 20 |
| Glass Fiber | 5 |
| Expanded Shale | 200 |

In Example 2 (Table 2), the reactive powder includes Class C fly ash and anhydrous calcium sulfate. The activator includes citric acid and sodium hydroxide, which are combined prior to mixing with the other components. The retardant is borax, the aerating agent is sodium peroxide, and the aggregate is expanded shale. The components are mixed for 15 seconds at ambient temperature, fed into molds, and allowed to cure.

TABLE 3

Example 3:

| Material | Parts by Weight |
| --- | --- |
| Class C Fly Ash | 100 |
| Sodium Hydroxide | 4.15 |
| Citric Acid | 2.0 |
| Boric Acid | 2.0 |
| Hydrogen Peroxide | 4 |
| Water | 6.6 |
| Expanded Perlite | 150 |
| Expanded Polystyrene Beads | 100 |

In Example 3 (Table 3), the reactive powder includes Class C fly ash. The activator includes citric acid and sodium hydroxide, which are combined prior to mixing with the other components. The retardant is boric acid, the aerating agent is hydrogen peroxide, and the aggregate includes expanded perlite and expanded polystyrene beads. The components are mixed for 15 seconds at ambient temperature, fed into molds, and allowed to cure.

TABLE 4

Example 4:

| Material | Parts by Weight |
| --- | --- |
| Class C Fly Ash | 100 |
| Sodium Hydroxide | 2.0 |
| Citric Acid | 1.8 |
| Borax | 0.5 |
| Sodium Dodecylbenzene Sulfonate | 0.05 |
| Water | 18 |
| Expanded Perlite | 200 |

In Example 4 (Table 4), the reactive powder includes Class C fly ash. The activator includes citric acid and sodium hydroxide, which are combined prior to mixing with the other components. The retardant is borax, the aerating agent is sodium dodecylbenzene sulfonate, and the aggregate includes expanded perlite. The components are mixed for 5 seconds at ambient temperature, fed into molds, and allowed to cure.

The compositions, materials, and methods of the appended claims are not limited in scope by the specific compositions, materials, and methods described herein, which are intended as illustrations of a few aspects of the claims and any compositions, materials, and methods that are functionally equivalent are intended to fall within the scope of the claims. Various modifications of the compositions, materials, and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed.

What is claimed is:

1. An inorganic polymer composition, comprising the reaction product of:
   reactive powder comprising 85% or greater fly ash, and
   an activator, wherein the activator includes a citrate or citric acid, and wherein the activator further includes sodium hydroxide;
   in the presence of water and an aerating agent selected from the group consisting of blowing agents, foaming agents, and mixtures thereof,
   wherein the reactive powder includes 5% by weight or less of Portland cement,
   wherein the activator is present in an amount of from 1.5% to 8.5% dry weight, based on the weight of the reactive powder, and
   wherein the aerating agent is present in an amount of from 1% to 8%, by weight of the reactive powder.

2. The composition of claim 1, wherein greater than 75% of the fly ash comprises Class C fly ash.

3. The composition of claim 1, wherein the fly ash is present in an amount of greater than 95% by weight of the reactive powder.

4. The composition of claim 1, wherein the reactive powder further comprises portland cement, calcium aluminate cement, calcium sulfoaluminate cement, slag, or a mixture thereof.

5. The composition of claim 1, wherein the composition is free from Portland cement.

6. The composition of claim 1, wherein the composition has a pH of from 12 to 13.5.

7. The composition of claim 1, wherein the weight ratio of water to reactive powder is from 0.06:1 to 0.25:1.

8. The composition of claim 1, wherein the weight ratio of water to reactive powder is from 0.06:1 to less than 0.15:1.

9. The composition of claim 1, wherein the blowing agent includes aluminum powder, a peroxide, a perborate, chlorine dioxide, or a mixture of these thereof.

10. The composition of claim 9, wherein the blowing agent includes a peroxide and the peroxide is provided to the composition as hydrogen peroxide, sodium peroxide, or an organic peroxide.

11. The composition of claim 9, wherein the blowing agent includes a perborate and the perborate is provided to the composition as sodium perborate.

12. The composition of claim 1, wherein the blowing agent is present in an amount of from 0.1% to 10% by weight of the reactive powder.

13. The composition of claim 1, wherein the blowing agent is present in an amount of from 0.5% to 5% by weight of the reactive powder.

14. The composition of claim 1 wherein the foaming agent includes non-ionic surfactants.

15. The composition of claim 1, further comprising aggregate.

16. The composition of claim 15, wherein the aggregate is lightweight aggregate selected from the group consisting of bottom ash, expanded clay, expanded shale, expanded perlite, vermiculite, volcanic tuff, pumice, hollow ceramic spheres, hollow plastic spheres, expanded plastic beads, ground tire rubber, and mixtures thereof.

17. The composition of claim 1, wherein the composition is free from retardants.

18. The composition of claim 1, further comprising fibers.

19. The composition of claim 1, further comprising a photocatalyst.

20. The composition of claim 1, wherein the activator includes calcium aluminate cement, comprising 0.5 to 5%.

21. An inorganic polymer composition, comprising the reaction product of elements consisting essentially of:
   reactive powder comprising 85% or greater fly ash, and
   an activator, wherein the activator includes a citrate or citric acid, and wherein the activator further includes sodium hydroxide; and
   optionally a retardant,
   in the presence of water and an aerating agent selected from the group consisting of blowing agents, foaming agents, and mixtures thereof,
   wherein the reactive powder includes 5% by weight of less of Portland cement,
   wherein the activator is present in an amount of from 1.5% to 8.5%, and
   wherein the aerating agent is present in an amount of from 1% to 8%.

\* \* \* \* \*